(12) United States Patent
Reber

(10) Patent No.: US 8,160,791 B2
(45) Date of Patent: Apr. 17, 2012

(54) METHOD AND DEVICE FOR DETECTING A MALFUNCTION OF A CONTROL COUPLING

(75) Inventor: Felix Reber, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 807 days.

(21) Appl. No.: 12/288,675

(22) Filed: Oct. 21, 2008

(65) Prior Publication Data

US 2009/0112426 A1   Apr. 30, 2009

(30) Foreign Application Priority Data

Oct. 22, 2007 (DE) .......... 10 2007 050 301

(51) Int. Cl.
*G06F 19/00* (2006.01)
(52) U.S. Cl. .......... 701/62; 701/63
(58) Field of Classification Search ........ 701/62, 701/63
See application file for complete search history.

(56) References Cited

U.S. PATENT DOCUMENTS

| | | | |
|---|---|---|---|
| 7,286,922 B1 | 10/2007 | Fischer et al. | |
| 7,503,876 B2 * | 3/2009 | Kitamura et al. | 477/125 |
| 2009/0082150 A1 * | 3/2009 | Wu et al. | 475/5 |

FOREIGN PATENT DOCUMENTS

| | | |
|---|---|---|
| EP | 550993 | 7/1993 |
| GB | 2335244 | 9/1999 |
| JP | 7-77226 | 3/1995 |
| JP | 7-158667 | 6/1995 |
| JP | 2001-218305 | 8/2001 |
| JP | 2002-16192 | 1/2002 |
| JP | 2005-282600 | 10/2005 |
| JP | 2006-283816 | 10/2006 |

* cited by examiner

*Primary Examiner* — Eric Culbreth
(74) *Attorney, Agent, or Firm* — Kenyon & Kenyon LLP

(57) ABSTRACT

A method for detecting a fault in a coupling having the coupling elements that are movable against each other, which are situated between a first drive unit and a second drive unit, having the steps of providing a torque by the second drive unit, activating the coupling so that the coupling elements are moved into a position which, in the normal state of the coupling, corresponds to a touch point position which corresponds to a position of the coupling elements in which, in the normal state of the coupling, the coupling elements lie against each other, but no torque is able to be transmitted between the coupling elements, determining, after the setting in of the touch point position, whether a torque is being transmitted from the second drive unit to the first drive unit via the coupling, as well as detecting a fault in the coupling if it is determined that a certain torque is being transmitted via the coupling.

11 Claims, 3 Drawing Sheets

METHOD AND DEVICE FOR DETECTING A MALFUNCTION OF A CONTROL COUPLING

RELATED APPLICATION INFORMATION

The present application claims priority to and the benefit of German patent application no. 10 2007 050301.8, which was filed in Germany on Oct. 22, 2007, the disclosure of which is incorporated herein by reference.

FIELD OF THE INVENTION

The present invention relates to a method and a device using which the malfunction of a coupling is able to be detected, especially a control coupling, which is situated between two drive units in a power train.

BACKGROUND INFORMATION

In motor vehicles that are able to be driven by a plurality of drive units, such as hybrid vehicles, the plurality of drive units may be positioned in a power train and be able to be coupled to one another using couplings. The coupling is opened or closed, depending on the type of operation of the vehicle.

Especially in the case of hydraulic couplings, based on malfunctions, it may happen that the coupling disks are not totally separated from each other in the open state, and a torque is transmitted. If the two coupling disks rotate at different speeds, this may lead to a grinding of the coupling disks, which causes them to wear. In addition, frictional heat is created, which may destroy the coupling and further components situated on it.

It would therefore be desirable to detect a malfunction of the coupling, particularly a malfunction which is able to lead to the further destruction of components.

SUMMARY OF THE INVENTION

It is therefore an object of the exemplary embodiments and/or exemplary methods of the present invention to provide a method and a device for the diagnosis of a coupling, using which the functioning of a coupling for connecting two drive units is able to be checked.

This object may be attained by the method for the diagnosis of a coupling as described herein and by the device according to the further description herein.

Further advantageous developments of the exemplary embodiments and/or exemplary methods of the present invention are also described herein.

According to a first aspect, a method is provided for detecting a fault in a coupling using coupling elements, that are movable against each other, which are situated between a first drive unit and a second drive unit. The method includes the steps of providing a torque through the second drive unit; driving the coupling, so that the coupling elements are moved into a position which, in the normal state of the coupling, corresponds to a touch point position, which corresponds to a position of the coupling elements in which, in the normal state of the coupling, the coupling elements lie against each other, but no torque is able to be transmitted between the coupling elements; the determination after setting the touch point position as to whether a torque is being transmitted from the second drive unit to the first drive unit via the coupling; as well as the detection of a malfunction of the coupling if it is determined that a certain torque is being transmitted via the coupling.

The above method has the advantage that a diagnosis may be made at any time with the coupling being open. In this way it is possible to detect a defect in the coupling early, and to initiate appropriate emergency measures in order to ensure the product safety of the vehicle and to prevent the destruction of additional vehicle parts. In addition, maintenance may be simplified, since a fault is able to be detected and appropriately signaled.

It may furthermore be provided that it should be determined whether the certain torque is being transmitted over the coupling if the first drive unit is at a standstill before the driving of the coupling, it being further determined that the torque is being transmitted if, after the driving of the coupling, the first drive unit is being moved by the driving of the second drive unit. In particular, it may be determined that the torque is being transmitted if, after the driving of the coupling, the first drive unit is being moved by the drive of the second drive unit at a speed which exceeds a threshold value.

Moreover, one of the above methods may be carried out at a predetermined time after the shutting down of the first drive unit and/or at a predetermined time after the opening of the coupling.

According to one specific embodiment, it may be detected whether a torque is being transmitted via the coupling if the first drive unit is being driven at a rotational speed before the driving of the coupling, it being determined that the torque is transmitted if, after the driving of the coupling, the motion of the first drive unit changes by the drive of the second drive unit, especially by a predetermined threshold value. The second drive unit may be torque-regulated, a fault in the coupling being detected if the rotational speed of the second drive unit changes upon running into the touch point.

According to a further aspect, a control unit is provided for detecting a fault in a coupling having coupling elements that are movable against each other, the coupling being able to be situated between a first drive unit and a second drive unit. The control unit is also developed to activate the coupling, so that the coupling elements are moved into a touch point position which, in the ordinary state of the coupling corresponds to a position of the coupling elements in which, in the normal state of the coupling, the coupling elements lie against each other, but no torque is able to be transmitted between the coupling elements; in order to detect whether a torque is being transmitted via the coupling; and in order to detect a fault in the coupling if a torque is being transmitted via the coupling.

According to one further aspect, a device is provided for detecting a fault in a coupling. The device includes a first drive unit and a second drive unit; the coupling having coupling elements that are movable against each other, which are situated between the first drive unit and the second drive unit, so that the drive units are able to be coupled to each other, so as to apply a torque to the common power train; as well as the above control unit.

Furthermore, the first drive unit may include an internal combustion engine and the second drive unit may include an electric motor.

According to one further aspect, a computer program is provided which includes a program code, and, if it is executed on a data processing unit, it executes one of the above methods.

Specific embodiments of the present invention are explained in greater detail in the following text on the basis of the attached drawings.

DETAILED DESCRIPTION

Figure 1:
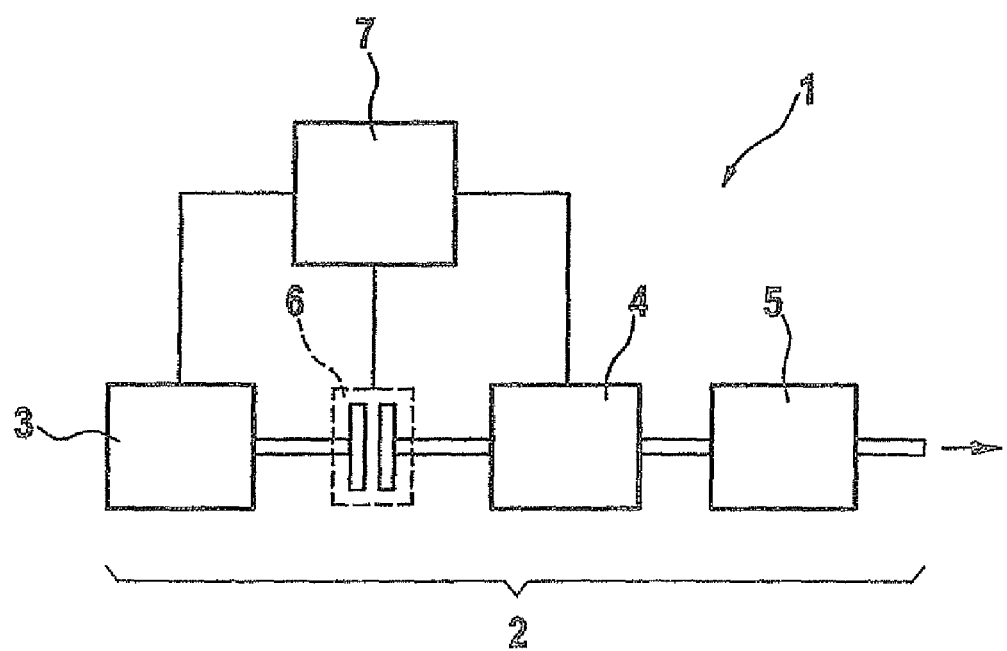
FIG. 1 shows a block diagram of a power train having two drive units, which are able to be coupled via a coupling.

FIG. 1 shows a drive system 1, for a motor vehicle, for instance, in which a power train 2 is able to be driven by two drive units 3, 4. First drive unit 3 may be developed as an internal combustion engine, for example, and second drive unit 4 as an electric motor. Power train 2 may be driven both by one of drive units 3, 4 and by both drive units 3, 4 together. A coupling 6 is situated between first drive unit 3 and second drive unit 4. In an operation exclusively using second drive unit 4, coupling 6 may be opened, so that second drive unit 4 does not have to carry along first drive unit 3, whereby power would be lost based on friction and the like. During operation via first drive unit 3, which is developed as an internal combustion engine, coupling 6 is closed and second drive unit 4 in the form of an electric motor is switched to passive, so that it is driven only via first drive unit 3. Alternatively, second drive unit 4, that is developed as an electric motor, may also be operated as a generator, so as to supply the vehicle electrical system with current.

Furthermore, on power train 5, a transmission is provided having in it a gear shifting clutch (not shown). Internal combustion engine 3, electric motor 4 and coupling 6 are controlled via a suitable control unit 7.

Figure 2:
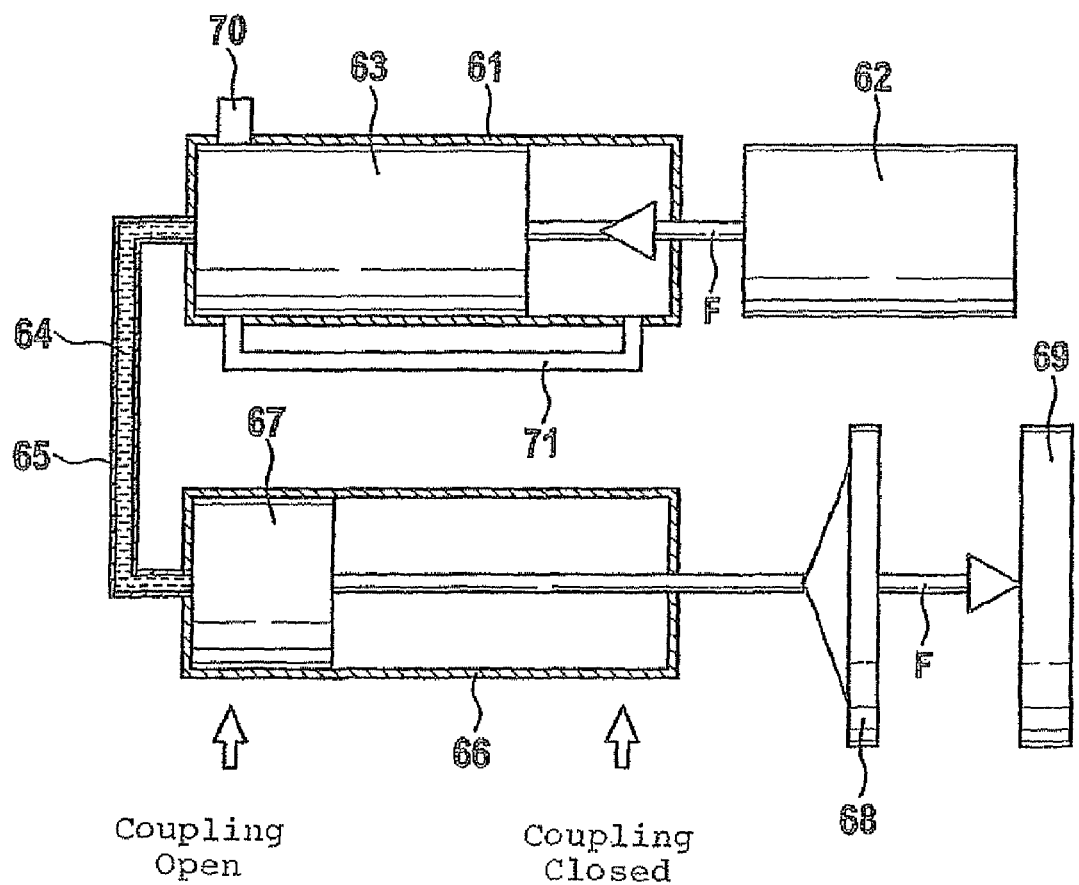
FIG. 2 shows a detailed representation of the coupling mechanism of FIG. 1.

FIG. 2 shows coupling 6 in greater detail. Coupling 6 has a master cylinder 61, in which a master piston 63 that is adjustable via a spindle drive 62 exerts pressure on a hydraulic fluid 64. Master cylinder 63 is connected to a slave cylinder 66 via a suitable pipeline 65, in which an additional piston 67 is moved by the pressure of hydraulic fluid 64. Additional piston 67 is coupled to a coupling disk 68, which is able to be moved in the direction of an additional coupling disc 69, or moved away from it. A pressure sensor 70 and a position sensor 71 are situated in master sensor 63, via which the force F, with which first coupling disk 68 presses against second coupling disk 69, as well as the position of first coupling disk 68 are able to be determined. The force and the position of first coupling disk 68 are determined by the control of spindle drive 62. Spindle drive 62 is activated by control unit 7. Depending on the selected operating type of drive system 1, control unit 7 opens and closes coupling 6, so that drive system 1 is able to drive, for example, the motor vehicle in internal combustion engine operation of in electric motor operation.

One defect in coupling 6 may occur, for instance, if there is air or the like in hydraulic fluid 64, so that a direct coupling between spindle drive 62 and first coupling disk 68 is no longer assured. In electric motor operation of drive system 1, in such a fault case, it may happen that, although coupling 6 is controlled by control unit 7 in such a way that coupling 6 is supposed to be fully open, coupling disks 68, 69 lie against each other and a torque is transmitted. Since a break-off torque is required for the co-rotation of the internal combustion engine, which may amount to 100 Nm, for example, in the case of a fault, it may happen that coupling disks 68, 69 rub against each other and transmit a torque without having it go as far as the co-rotation of the internal combustion engine. Coupling disks 68, 69, which rub against each other, are thereby worn down, and in addition, frictional heat is created which may lead to damage of further components in drive system 1.

In order to detect such a fault case early, control unit 7 executes a diagnostic method. The diagnostic method may, for instance, always be carried out when the system switches over from an internal combustion engine operation to an electric motor operation, that is, in a state in which the internal combustion engine has just been shut down and the driving power is now provided completely by the electric motor. In response to this switching over, coupling 6 is controlled in such a way that coupling disks 68, 69 are completely separated from each other.

Figure 3:
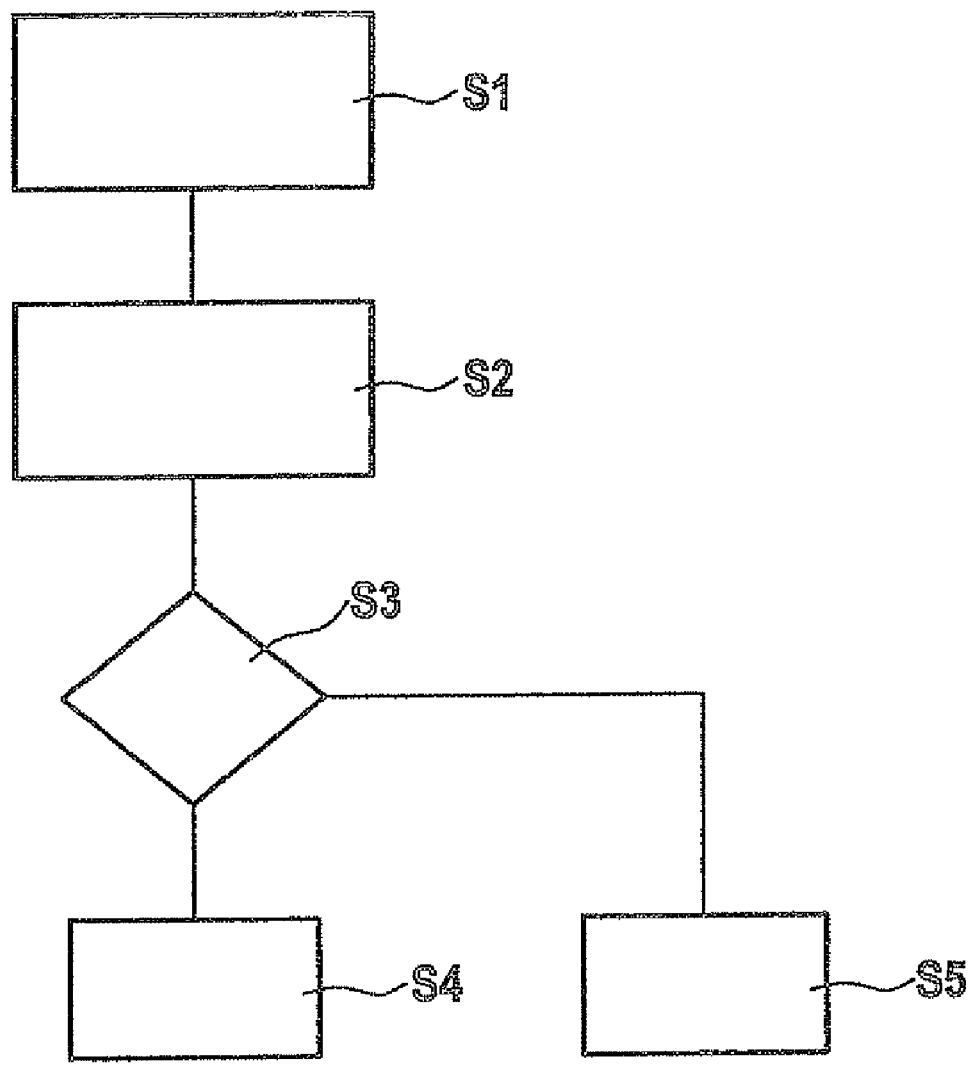
FIG. 3 shows a flow chart to illustrate the diagnostic method according to one specific embodiment of the present invention.

The flow chart in FIG. 3 makes clear the subsequent course of the method for the diagnosis of coupling 6. The diagnosis of coupling 6 is started, for instance, each time coupling 6 is opened, i.e. internal combustion engine 3 is decoupled. The diagnosis of coupling 6 may also be started at regular intervals or at predetermined points in time. It may also be provided that the diagnosis of coupling 6 is only performed if the last diagnosis took place going back a specified period of time, such as a period of time in a range between one hour or one day, or if no fault was detected in a preceding diagnosis.

After starting the diagnostic method in step S1, first of all, controlled by control unit 7, coupling disks 68, 69 are moved in such a way that first coupling disk 68 is at the position of the touch point. The touch point is taught to the system by a preceding touch point adaptation, and corresponds to the position of coupling disk 68 at which coupling disks 68, 69 touch, but no torque is transmitted as yet. The teaching of the touch point takes place in a usual method that is separate from this diagnostic method, and is carried out periodically or at predetermined points in time. When coupling 6 is open, coupling disks 68, 69 are separated from each other, going beyond the touch point, the separation distance of coupling disks 68, 69 in the open state being known by knowledge of the touch point and by knowledge of the position of the piston in master cylinder 61.

In order to check coupling 6, in step S2, spindle drive 62 is now controlled in such a way that, in response to the assumption of a correct position of the touch point, the touch point is run into. In the case of the orderly functioning of coupling 6, first coupling disk 68 is now located at the touch point, and no torque is transmitted.

In step S3 it is checked whether the touch point has been run into or whether it has been crossed. If coupling 6 is defective, the touch point is crossed during the running into the supposed touch point, and a torque is transmitted. Faulty functioning of coupling 6 may then be established by the co-rotation of internal combustion engine 3, based on the torque transmitted via coupling 6. If in step S3, after the running into the touch point in step S2, it is determined that internal combustion engine 3 is beginning to co-rotate, this is detected by control unit 7 in step S4, and a fault message is output.

The output of the fault message is able to take place as information to the driver. Alternatively or in addition, emergency measures may be carried out which prevent damage to further components of the vehicle, and/or a corresponding fault information may be stored in a memory of a vehicle control unit.

If it is determined in step S3 that internal combustion engine 3 is not co-rotating after the running into the touch point, this could mean that the touch point in step S2 was passed by a small amount and that torque was transmitted. The transmitted torque may, however, be less than the break-off torque or the torque needed to drive the internal combustion engine. This may still be established in step 5 as coupling 6 being fault-free, since this does not result in a serious faulty functioning of coupling 6, because, in response to the activation of the open state, the adjustment path between first and second coupling disks 68, 69 is selected so that the latter are separate from each other in every case.

The method described above may also be carried out while internal combustion engine 3 is running, in this case the operating parameters of the internal combustion engine, such as the rotational speed, having to be known, in order to be able to conclude that there is a malfunction of coupling 6, from a change in the operating parameters, in response to the running into the supposed touch point of coupling 6, according to step S2, based on the transmission of a torque.

Alternatively, in the case of a torque-regulated electric motor 4 which rotates at a rotational speed when there is an open coupling 6, one may conclude that coupling 6 is faulty if the rotational speed of electric motor 4 changes when the touch point is run into.

What is claimed is:

1. A method for detecting a fault in a coupling, having coupling elements that are movable against each other, and which are situated between a first drive unit and a second drive unit, the method comprising:
   providing a torque by the second drive unit, wherein the first and second drive units are each configured to independently generate torques;
   activating the coupling so that the coupling elements are moved to a position which, in a normal state of the coupling, corresponds to a touch point position which corresponds to a position of the coupling elements in which, in the normal state of the coupling, the coupling elements lie against each other, but no torque is transmittable between the coupling elements;
   determining, after setting the touch point position, whether a torque is being transmitted from the second drive unit to the first drive unit via the coupling; and
   detecting a fault in the coupling when it is determined that a certain torque is being transmitted via the coupling.

2. The method of claim 1, wherein the determination as to whether the certain torque is being transmitted via the coupling is performed when the first drive unit is at a standstill before the activation of the coupling, it being determined that the torque is transmitted if, after the activation of the coupling, the first drive unit is moved by being driven by the second drive unit.

3. The method of claim 2, wherein it is determined that the torque is transmitted if, after the activation of the coupling, the first drive unit is moved by being driven by the second drive unit at a speed that exceeds a threshold value.

4. The method of claim 2, which is performed at least one of at a predetermined time after a shutting down of the first drive unit and at a predetermined time after an opening of the coupling.

5. The method of claim 1, wherein the detection as to whether a torque is being transmitted via the coupling is performed if the first drive unit is being driven at a rotational speed before the activation of the coupling, it being determined that the torque is transmitted if, after the activation of the coupling, the motion of the first drive unit changes because of the drive by the second drive unit, by a predetermined threshold value.

6. The method of claim 1, wherein the second drive unit is torque-regulated, a fault of the coupling being detected if the rotational speed of the second drive unit changes in response to the running into the touch point.

7. The method of claim 1, wherein the first drive unit includes an internal combustion engine and the second drive unit includes an electric motor.

8. A control unit for detecting a fault in a coupling, having coupling elements that are movable against each other, which is positionable between a first drive unit and a second drive unit, wherein the first and second drive units are each configured to independently generate torques, comprising:
   an activating arrangement to activate the coupling so that the coupling elements are moved into a touch point position which, in the normal state of the coupling, corresponds to a position of the coupling elements in which, in the normal state of the coupling, the coupling elements lie against each other, but no torque is transmittable between the coupling elements; and
   a detecting arrangement to detect whether a torque generated by the second drive unit is being transmitted to the first drive unit via the coupling, and to detect a fault in the coupling if a torque is being transmitted via the coupling.

9. A device for detecting a fault in a coupling, comprising:
   a first drive unit;
   a second drive unit, wherein the coupling includes coupling elements that are movable against each other and which are situated between the first drive unit and the second drive unit, so that the drive units are couplable to each other to apply a torque to a common power train, wherein the first and second drive units are each configured to independently generate torques; and
   a control unit for detecting a fault in the coupling, the control unit including:
      an activating arrangement to activate the coupling so that the coupling elements are moved into a touch point position which, in the normal state of the coupling, corresponds to a position of the coupling elements in which, in the normal state of the coupling, the coupling elements lie against each other, but no torque is transmittable between the coupling elements; and
      a detecting arrangement to detect whether a torque generated by the second drive unit is being transmitted to the first drive unit via the coupling, and to detect a fault in the coupling if a torque is being transmitted via the coupling.

10. The device of claim 9, wherein the first drive unit includes an internal combustion engine and the second drive unit includes an electric motor.

11. A non-transitory computer readable data-storage medium storing a program having program codes which, when executed on a computer, performs a method for detecting a fault in a coupling, having coupling elements that are movable against each other, and which are situated between a first drive unit and a second drive unit, the method comprising:
   providing a torque by the second drive unit, wherein the first and second drive units are each configured to independently generate torques;
   activating the coupling so that the coupling elements are moved to a position which, in a normal state of the coupling, corresponds to a touch point position which corresponds to a position of the coupling elements in which, in the normal state of the coupling, the coupling elements lie against each other, but no torque is transmittable between the coupling elements;
   determining, after setting the touch point position, whether a torque is being transmitted from the second drive unit to the first drive unit via the coupling; and
   detecting a fault in the coupling when it is determined that a certain torque is being transmitted via the coupling.

* * * * *